United States Patent
Bardon

(10) Patent No.: US 6,902,599 B2
(45) Date of Patent: Jun. 7, 2005

(54) FILTERING BODY FOR FILTERING PARTICLES CONTAINED IN AN INTERNAL COMBUSTION ENGINE EXHAUST GASES

(75) Inventor: Sébastien Bardon, Lyons (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 0 days.

(21) Appl. No.: 10/678,220

(22) Filed: Oct. 6, 2003

(65) Prior Publication Data

US 2004/0134173 A1 Jul. 15, 2004

Related U.S. Application Data

(63) Continuation of application No. PCT/FR02/01178, filed on Apr. 4, 2002.

(30) Foreign Application Priority Data

Apr. 6, 2001 (FR) .............................................. 01 04686
Sep. 12, 2001 (FR) ............................................. 01 11795

(51) Int. Cl.$^7$ .............................................. B01D 46/00
(52) U.S. Cl. ...................... 55/523; 55/282.3; 55/385.3; 55/484; 55/DIG. 30; 60/311
(58) Field of Search .............................. 55/282.3, 385.3, 55/484, 523, DIG. 10, DIG. 30; 60/311; 428/116

(56) References Cited

U.S. PATENT DOCUMENTS

| | | | |
|---|---|---|---|
| 4,436,538 A | 3/1984 | Tomita et al. | |
| 4,659,348 A | * 4/1987 | Mayer | 55/DIG. 30 |
| 4,810,554 A | 3/1989 | Hattori et al. | |
| 5,171,335 A | * 12/1992 | Kojima et al. | 55/523 |
| 5,655,211 A | 8/1997 | Maus | |
| 6,656,564 B2 | * 12/2003 | Ichikawa et al. | 55/523 |
| 6,673,414 B2 | * 1/2004 | Ketcham et al. | 55/523 |
| 2004/0088959 A1 | * 5/2004 | Saito et al. | 55/523 |
| 2004/0123573 A1 | * 7/2004 | Ichikawa et al. | 55/523 |

FOREIGN PATENT DOCUMENTS

| | | | |
|---|---|---|---|
| DE | 199 43 846 | 3/2001 | |
| EP | 0 225 402 | 6/1987 | |
| EP | 0 480 396 | 4/1992 | |
| FR | 2 705 404 | 11/1994 | |
| JP | 2000-279728 | * 10/2000 | B01D/39/20 |

OTHER PUBLICATIONS

Patent Abstracts of Japan vol. 005, No. 148 (C–072), Sep. 18, 1981 & JP 50 081135 A, Jul. 2, 1981.

* cited by examiner

*Primary Examiner*—Duane Smith
*Assistant Examiner*—Jason M. Greene
(74) *Attorney, Agent, or Firm*—Young & Thompson

(57) ABSTRACT

The invention concerns a filtering body (7) consisting of a plurality of adjacent channels through the walls of which the exhaust gases are filtered. It comprises first (12 to 23) and second (8 to 11) filtering zones, the surface filtering the gases, relative to the unit area of the gas intake of the body (7), being different in the first (12 to 23) and second (8 to 11) zones. The invention is applicable to a diesel engine.

12 Claims, 2 Drawing Sheets

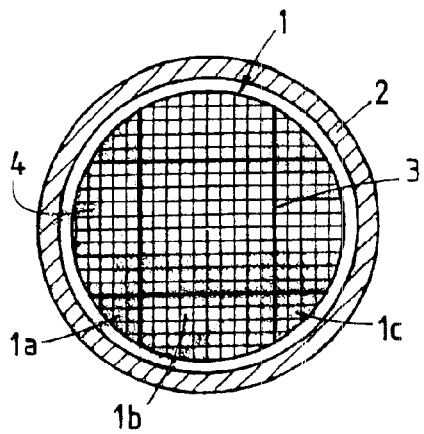
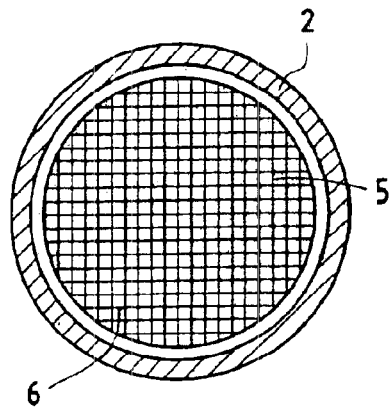
FIG.1
PRIOR ART
FIG.2
PRIOR ART
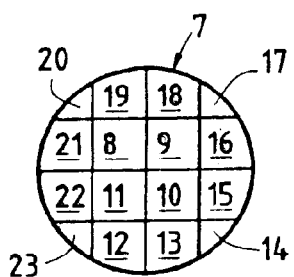
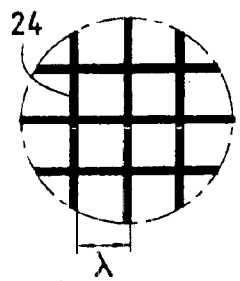
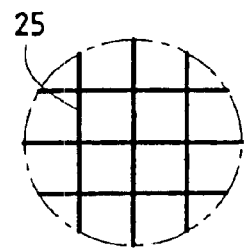
FIG.3
FIG.4
FIG.5
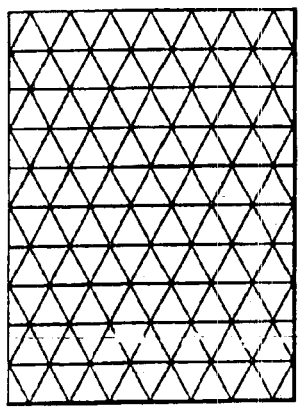
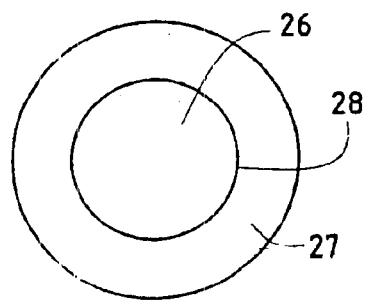
FIG.6
FIG.7

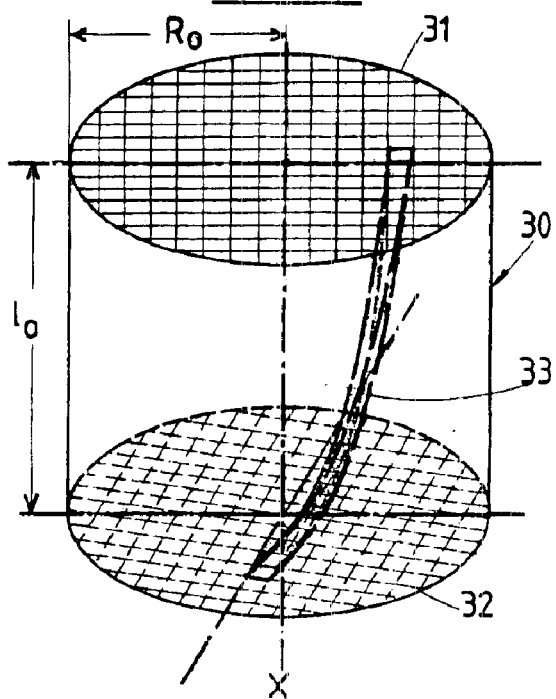
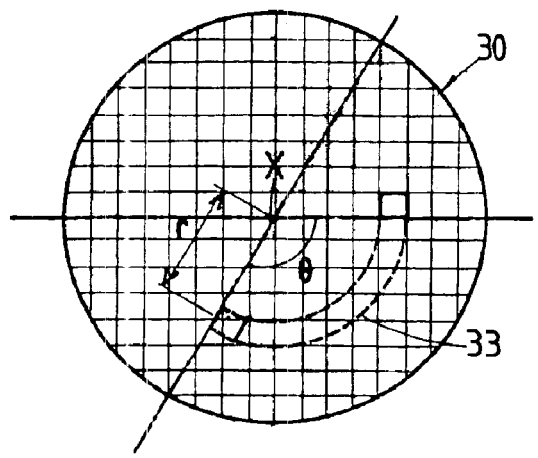
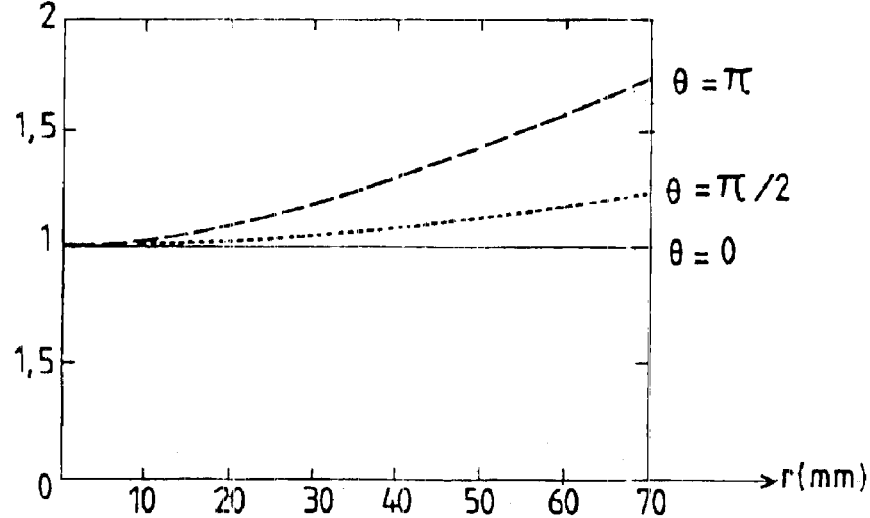

FILTERING BODY FOR FILTERING PARTICLES CONTAINED IN AN INTERNAL COMBUSTION ENGINE EXHAUST GASES

This application is a continuation of International PCT Application No.PCT/FR02/01178, filed on 4 Apr. 2002, which designated the United States.

FIELD OF THE INVENTION

The invention relates to filtering bodies for filtering particles contained in the exhaust gases of an internal combustion engine, in particular of the diesel type.

BACKGROUND OF THE INVENTION

Porous honeycomb structures are used as filtering bodies for filtering particles emitted by diesel vehicles. These filtering bodies are generally made of ceramic (cordierite, silicon carbide, etc). They can be monolithic or constituted of different blocks. In the latter case, the blocks are fastened together by bonding them by means of a ceramic cement. The whole is then machined to the required section, which is generally round or oval. The filtering body can include a plurality of adjacent passages. It is inserted into a metal enclosure. Each passage is closed at one end; the exhaust gases are therefore obliged to pass through the lateral walls of the passages; thus the particles or soot are deposited in the filtering body.

After some time of use, soot accumulates in the passages of the filtering body, which increases the head loss caused by the filtering body and degrades the performance of the engine. For this reason, the filtering body must be regenerated regularly (for example every 500 kilometers).

Regeneration consists in oxidizing the soot. To this end, it is necessary to heat the soot. The temperature of the exhaust gases is of the order of 300° C. whereas the flashpoint of soot is of the order of 600° C. under normal operating conditions. It is possible to add additives to the fuel to catalyze the reaction of oxidation of the soot and reduce the flashpoint by approximately 150° C. The heating can be applied to the exhaust gases, to the upstream face of the filtering body, or directly to the soot deposited on the filtering body. Different techniques have been developed but require a great deal of energy and are very often difficult to control.

A more recent and advantageous approach consists in local heating (for example in front of the filtering body) to ignite the soot and initiate its combustion, which propagates to the whole of the filtering body via the soot. This type of technique is described in patent applications FR-A-2 771 449 and DE-A-19530749, for example.

This solution has drawbacks, in particular because the soot is unevenly distributed in the filtering body. Mainly because the exhaust pipe that feeds the filtering body is of smaller section than the latter, there is a greater flow of exhaust gas in the core of the filtering body than at its periphery. The quantity of soot deposited is thus also greater in the core of the filtering body.

Under these conditions, if combustion is initiated locally, for example on the front face of the filtering body, the soot is thoroughly consumed in the longitudinally central portion but the quantity of soot in the peripheral area is too small to transmit heat and for combustion to propagate to all of the filtering body.

This has two consequences that significantly affect the service life of the filtering body. The poor transmission of heat radially inside the filtering body creates high thermomechanical stresses between the hot core and the much cooler periphery. These stresses weaken the structure of the filtering body. Moreover, propagation of combustion of the soot being poor at the periphery, the regeneration of the filter is incomplete and the filter is less efficient after regeneration.

There therefore exists a requirement for a body for filtering particles contained in the exhaust gas of internal combustion engines, in particular diesel engines, that improves regeneration conditions.

The invention aims to satisfy this requirement.

SUMMARY OF THE INVENTION

To be more specific, the invention consists in a filtering body for a particle filter for purifying exhaust gases of an internal combustion engine, in particular a diesel engine, consisting of a plurality of adjacent passages through lateral walls of which said exhaust gases are filtered, characterized in that said body includes at least a first filter region and a second filter region, the gas filtering surface area, referred to the unit gas entry surface area of said body, being different in said first region and said second region.

The expression "filtering surface area" refers to the whole of the area available for collecting the particles per unit surface area of the front section or "inlet" of this filtering body.

According to other features of the present invention:

said first and second regions respectively occupy a peripheral portion and a central portion of said filtering body and the peripheral portion has a greater filtering surface area than the central portion of the filtering body;

the body takes the form of a circular cylinder in which the axis of each passage extends along a helix centered on the axis of said cylinder, the length and the lateral surface area of said passage being an increasing function of the radius of said helix;

the region of greater filtering surface area is adapted to be located in operation in the vicinity of a heat source intended to initiate regeneration of said filtering body;

the filtration surface area of one of said regions is at least 10% greater than that of the other region;

the filtering body is made from silicon carbide or cordierite.

The following description, which refers to the appended drawings, explains the invention and assesses its advantages.

DESCRIPTION OF THE DRAWINGS

In the drawings:

FIG. 1 is a view in cross section of a prior art filtering body made by assembling nine blocks, FIG. 2 is a view in cross section of a prior art monolithic filtering body with passages of square cross section, FIG. 3 is a view of the upstream face of a filtering body according to the invention made by assembling sixteen blocks, FIG. 4 is a diagrammatic view of a portion of the upstream face of one block from one region of the FIG. 3 filtering body, FIG. 5 is a diagrammatic view of a portion of the upstream face of one block from another region of the FIG. 3 filtering body, FIG. 6 is a diagrammatic view of a portion of the upstream face of another embodiment of a block from one region of the FIG. 3 filtering body, and FIG. 7 shows another embodiment of a filtering body according to the invention, having two concentric regions with different characteristics, FIGS. 8 and 9 are respectively a perspective view and a plan view of a further embodiment of the filtering body according to the invention, and FIG. 10 represents graphs illustrating the characteristics of the filtering bodies shown in FIGS. 8 and 9.

DETAILED DESCRIPTION

In the present context the characteristics of the material constituting the filtering body are not relevant to evaluating the filtering surface area. If there are differences in permeability, porosity, etc in different regions of the filtering body, they are very quickly compensated by the thickness of the bed of soot that is formed. Thus the filtering surface area is related exclusively to the geometry of the filtering body. Given the tolerances of the tooling used to make the filtering bodies, filtering surface areas are regarded as different if the difference between them is greater than or equal to 5%.

Hereinafter the term "surface density" means, for a given region, the total number of passages divided by the front surface area of the region.

FIG. 1 shows a view in cross section of a prior art filtering body 1 surrounded by a metal enclosure 2. The filtering body 1 is constituted of different blocks 1a, 1b, 1c bonded together by means of a ceramic cement 3. Each block incorporates a multitude of square section passages 4 alternately closed on the upstream face and the downstream face of the filtering body, as is well known in the art. In this case, the filtering surface area is equal to the interior perimeter of the passage multiplied by the surface density of the filtering body, divided by two (one passage in two being closed) and multiplied by the length of the filtering body. The interior perimeter of a passage typically measures from 4 to 6 mm, the surface density is typically from 200 to 300 cpsi (cells per square inch), i.e. from 31 to 47 passages/cm$^2$, and the length of the filtering body is from 15 to 30 cm. For a filter length of 25 cm, the filtering surface area generally varies from 200 to 350 cm$^2$ for every cm$^2$ of front surface area.

FIG. 2 shows another example of a prior art filtering body 5 surrounded by its metal enclosure 2. The filtering body is monolithic and incorporates a multitude of square section passages 6 closed alternately on the upstream face and the downstream face of the filtering body.

FIG. 3 shows one embodiment of a filtering body 7 according to the invention with its metal enclosure 2 removed. It is constituted of different blocks 8 to 23 fastened together by means of a ceramic cement. Each block incorporates a multitude of passages that are not shown in this figure but sectional detail views of which are shown diagrammatically in FIGS. 4 and 5.

FIG. 4 shows the passages constituting the central blocks 8 to 11 from FIG. 3. Each passage wall 24 is 0.5 mm thick and the pitch $\lambda$ between two successive passages is equal to 1.8 mm. The surface density is 200 cpsi, i.e. 31 channels/cm$^2$. For clarity, the alternate closing of the passages is not shown in FIGS. 4 to 6. For a structure such as that shown in FIG. 4, and for a filter 25 cm long, the filtering surface area is 201 cm$^2$ for every cm$^2$ of front surface area.

FIG. 5 shows the passages constituting the blocks 12 to 23 from FIG. 3. Each passage wall 25 is 0.2 mm thick, which is thinner than the walls 24. The pitch $\lambda$ of the passages and the surface density are identical to those of the FIG. 4 passages. Compared to FIG. 4, here the filtering surface area is much greater. Here it is equal to 247 cm$^2$ for every cm$^2$ of front surface area. This filtering surface area is in fact proportional to the cumulative interior perimeter of all the passages.

By placing blocks with a greater filtering surface area at the external periphery of the filtering body 7 in this way, a greater proportion of the flow of exhaust gas is forced to pass through this exterior filtering region. The deposition of soot is increased commensurately in this region and the quantity of particles deposited is thus distributed more homogeneously throughout the filtering body. This establishes the conditions necessary for good thermal regeneration. The progressive transmission of heat through the soot is significantly improved and the combustion of the soot can propagate throughout the filtering body.

Moreover, a more homogeneous distribution of the soot in the filter causes a lower head loss. This constitutes an important advantage of the present invention.

As an alternative to the above examples, increasing the filtering surface area by increasing the surface density can be envisaged. Thanks in part to improved fabrication processes, surface densities can be increased and wall thicknesses reduced. For example, for a filtering element as shown in FIG. 4 that is 25 cm long and has a wall thickness equal to 0.2 mm, the filtering surface area is equal to 181 cm$^2$ for every cm$^2$ of front surface area if the surface density is equal to 100 cpsi or 15.5 channels/cm$^2$ ($\lambda$=2.54 mm), whereas it is equal to 331 if the surface density is equal to 400 cpsi, i.e. 62 channels/cm$^2$ ($\lambda$=1.27 mm). It is clear that this parameter enables the filtering surface area to be increased considerably with a constant wall thickness.

Note here that reducing the size of the passages is nevertheless limited by the problem of potential blocking of the passage by combustion residues after burning the soot.

FIG. 6 shows another embodiment of the blocks 11 to 23 of the FIG. 3 filtering body. In this case, the passages have a triangular section, with a surface density of 200 cpsi (31 channels/cm$^2$) and a wall thickness of 0.36 mm. In this case, the filtering surface area is 245 cm$^2$ for every cm$^2$ of front surface area for a filter 25 cm long. By way of comparison, a filtering body having a geometry of the type shown in FIGS. 4 and 5, a wall thickness of 0.36 mm and a surface density equal to 200 cpsi or 31 channels/cm$^2$ ($\lambda$=1.8 mm) has a filtering surface area equal to 222 cm$^2$ for every cm$^2$ of front surface area for a filter 25 cm long. The FIG. 6 embodiment therefore provides a greater filtering surface area and the deposition of soot is therefore more homogeneous. Note, however, that under these comparative conditions, the triangular geometry increases the mass of the filtering body, which can be problematical in the automotive industry.

As an alternative to the above embodiment, and to avoid this problem, using the same type of passages as in FIG. 6 is envisaged, but with a smaller passage wall thickness. This could retain the same mass for a filtering body made entirely from blocks constituted as in FIG. 4, and for a filtering body as shown in FIG. 6, at least one block of which is constituted of smaller passages with thinner walls. However, reducing the thickness of the walls is limited by problems with producing the passages and by the fragility of blocks constituted of passages having very thin walls; at present the walls cannot have a thickness of less than 50 $\mu$m.

It is particularly beneficial to use triangular section passages because the thermal conductivity of this type of geometry is better than that of an array of square section passages.

Another embodiment relates to a filtering body as shown in FIG. 3 in which the blocks 14, 17, 20 and 23 have a larger filtering surface area than the other blocks—for example with passages like those shown in FIGS. 5 and 6 for the blocks 14, 17, 20 and 23 and like those shown in FIG. 4 for the other blocks. This embodiment is particularly advantageous if hot spots intended to initiate combustion are situated in the vicinity of blocks 14, 17, 20 and 23. The local increase in the filtering surface area ensures good accumulation of soot and guarantees that regeneration starts properly in these areas.

FIG. 7 shows another embodiment of the invention, obtained by bonding concentrically two portions defining filtering regions 26 and 27 with a ceramic joint 28. The region 26 can consist of passages as shown in FIG. 4. The region 27 can consist of passages as shown in FIG. 5 or FIG. 6. In this embodiment also, the outermost portion of the filtering body has a larger filtering surface area, which homogenizes the deposition of soot and thereby improves the efficiency of regeneration, whilst reducing thermomechanical stresses.

As an alternative to the above example, the two portions 26 and 27 could be two filtering regions of the same monolithic filtering body. A more gentle transition between the two regions can also be envisaged.

These embodiments of the invention provide the advantages previously cited without disadvantages in terms of their fabrication or use. In particular, they need no additional machining or bonding steps compared to the prior art filtering body shown in FIG. 1. Moreover, the overall shape of the filtering body remains unchanged and therefore has no repercussions in relation to automated assembly lines as used in the automotive industry.

There can also be a progressive increase in the filtering surface area from the core toward the periphery of the filtering body, as is the case in the embodiment of the body according to the invention shown in FIGS. 8 and 9.

As can be seen in these figures, the filtering body 30 takes the form of a circular cylinder of radius $R_0$ and length $l_0$ between two bases 31 and 32 of the cylinder.

The volume occupied by one passage 33 of the body is shown in bold dashed line, the other passages being omitted to clarify the figure. All the passages have the same surface area in section in a plane perpendicular to the axis X of the cylinder.

According to the invention, the axis of any passage in the body, such as the passage 33, is developed along an arc of a helix, for example of constant pitch, the helix being centered on the axis X of the cylinder 32, and the arc subtending an angle θ (see FIG. 9) and having a radius r measured from the axis X.

It can be shown that the length $l_c$ of this helix arc is given by the equation:

$$l_c = \sqrt{l_0^2 + r^2\theta^2}$$

The FIG. 10 graphs show, for two values π/2 and π of the subtended angle θ, the increase in the ratio $l_c/l_0$ with the radius r of the helix arc along which the axis of the passage extends, this increase obviously being accompanied by a correlative increase in the lateral surface area of a passage, and thus the local filtering surface area, from the axis X of the filtering body to its periphery.

The total filtering surface area SF offered to the gas by the filtering body is also a function of the angle θ subtended by the passages, which is constant throughout the filtering body.

For example, for a filtering body of length $l_0$=152 mm and radius $R_0$=72 mm, the total filtering surface area SF is greater by 12% (θ=π/2) or 43% (θ=π) than that of a body with straight passages of length $l_0$ parallel to the axis X.

It will be clear to the person skilled in the art that the 3D printing fabrication process routinely used for various materials, including ceramics, is very suitable for fabricating the FIGS. 8 and 9 filtering body.

The various embodiments described hereinabove are described by way of example only and are in no way limiting on the scope of the invention. The invention encompasses any type of filtering body, regardless of the shape and the dimensions of the passages, provided that the filtering body includes at least two separate regions differing in their filtering surface areas, one of the regions having a filtering surface area at least 5% greater than that of the other, and preferably at least 10% greater.

It has been pointed out that filtering body designs according to the invention optimize the distribution of the soot in the filtering body. By optimization is meant better control of the deposition regions. This can be reflected, as required, in homogenization of the quantity of soot deposited in the various regions of the filtering body or in "forced" accumulation of soot at a precise point, for example in the vicinity of a hot spot at which regeneration should start.

Without wishing to associate the invention with any particular theory, it is thought that these results are related to the balancing of the head loss at all points in the filtering body. Under equilibrium conditions, the head loss is the same at all points of the filtering body. The head loss is essentially caused by the passage of the gas through the lateral walls of the passages constituting the filtering body. The speed of passage of the gas being identical at all points, the exhaust gas flowrate must compensate the filtering surface area differences. Proposing regions differing in terms of their filtering surface areas creates regions in which the exhaust gas flowrate is increased by increasing the filtering surface area and therefore where the quantity of soot deposited is greater than in the absence of this increase.

What is claimed is:

1. A filtering body for a particle filter for filtering exhaust gases of an internal combustion engine, the filtering body comprising:
   a plurality of blocks of adjacent, alternately closed, passages with lateral walls through which exhaust gases are filtered,
   wherein said blocks are in at least a first filter region and a second filter region, wherein a gas filtering surface area per unit of filter body front surface area is different in said first filter region than in said second filter region, and
   wherein said blocks of said first filter region have a different surface density of said passages than said blocks of said second filter region.

2. The filtering body according to claim 1, wherein said passages of said blocks in said first and second filter regions have an identical pitch and wherein said lateral walls of said passages of said blocks in said first filter region have a thickness different than said lateral walls of said passages of said blocks in said second filter region.

3. The filtering body according to claim 1, wherein said first filter region occupies a peripheral portion of the filtering body and said second filter region occupies a central portion of said filtering body, and wherein said peripheral portion has a greater gas filtering surface area per unit of filter body front surface area than said central portion.

4. The filtering body according to claim 3, wherein said lateral walls of said passages of said blocks in said first and second filter regions have a same thickness and wherein a pitch of said passages of said blocks in said first filter region is less than a pitch of said passages of said blocks in said second filter region.

5. The filtering body according to claim 3, wherein the surface density of said blocks in said first filter region is greater than the surface density of said blocks in said second filter region.

6. The filtering body according to claim 1, wherein a one of said first and second filter regions having a greater gas filtering surface area per unit of filter body front surface area is adjacent to a heat source for initiating regeneration of the filtering body.

7. The filtering body according to claim 1, wherein the gas filtering surface area per unit of filter body front surface area of one of said first and second filter regions is at least 10% greater than that of the other of said first and second filter regions.

8. The filtering body according to claim 1, wherein said lateral walls comprise one of silicon carbide and cordierite.

9. The filtering body according to claim 1, wherein said lateral walls of said passages of said blocks in said first and second filter regions have a same thickness and wherein a pitch of said passages of said blocks in said first filter region is different than a pitch of said passages of said blocks in said second filter region.

10. The filtering body according to claim 1, wherein said passages are triangular.

11. A filtering body for a particle filter for filtering exhaust gases of an internal combustion engine, the filtering body comprising:

a filter material that has plural passages with lateral walls through which exhaust gases are filtered, said filter material having a peripheral filter region and a central filter region, said peripheral filter region having a greater gas filtering surface area per unit of filter body front surface area than said central filter region, and said peripheral filter region having a greater surface density of said passages than said central filter region.

12. The filtering body according to claim 11, wherein said lateral walls of said passages of said peripheral and central filter regions have a same thickness and wherein a pitch of said passages of said peripheral filter region is less than a pitch of said passages in said central filter region.

* * * * *